United States Patent [19]
Ernst

[11] Patent Number: 5,740,980
[45] Date of Patent: Apr. 21, 1998

[54] SAFETY BELT REELING DEVICE WITH INCLINATION COMPENSATION FOR A VEHICLE-SENSITIVE SENSOR

[75] Inventor: Hans-Helmut Ernst, Ahrensburg, Germany

[73] Assignee: Autoliv Development AB, Vargarda, Sweden

[21] Appl. No.: 691,481

[22] Filed: Aug. 2, 1996

[30] Foreign Application Priority Data

Aug. 2, 1995 [DE] Germany ............... 195 28 153.5

[51] Int. Cl.[6] ............... A62B 35/00; B65H 75/48
[52] U.S. Cl. ............................................. 242/384.4
[58] Field of Search ................ 242/384.1, 384.4; 280/805, 806, 807

[56] References Cited

U.S. PATENT DOCUMENTS

| | | |
|---|---|---|
| 3,552,676 | 1/1971 | Weber . |
| 4,164,337 | 8/1979 | Blom . |
| 4,341,360 | 7/1982 | Lindblad ............... 242/384.4 |
| 4,610,480 | 9/1986 | Yamada et al. ............... 242/384.4 |
| 4,978,087 | 12/1990 | Tauber ............... 242/384.4 |
| 5,289,986 | 3/1994 | Hoshihara . |
| 5,495,994 | 3/1996 | Rumpf et al. ............... 242/384.4 |
| 5,568,941 | 10/1996 | Woydick et al. ............... 280/806 |

FOREIGN PATENT DOCUMENTS

| | | | |
|---|---|---|---|
| 2 520 622 | 8/1983 | France ............... 242/384.4 |
| 7811279 | 4/1978 | Germany . |
| 3611004 | 10/1987 | Germany . |
| 37 05 920 A1 | 9/1988 | Germany ............... 280/806 |
| 39 12 027 A1 | 10/1989 | Germany ............... 280/806 |
| 3824164 | 1/1990 | Germany . |
| 1 528 184 | 10/1978 | United Kingdom ............... 280/806 |
| 1599188 | 9/1981 | United Kingdom . |

*Primary Examiner*—John P. Darling
*Attorney, Agent, or Firm*—Robert W. Becker & Associates

[57] ABSTRACT

A safety belt reeling device with inclination compensation is connected to a vehicle seat, wherein the part of the vehicle seat to which the safety belt reeling device is connected is inclination-adjustable relative to the axis oriented to the center of the earth, and has a vehicle-sensitive acceleration sensor to be oriented in a nominal position to the center of the earth. A pendulum mass, pivotable about a pivot point, acts on the acceleration sensor for returning the acceleration sensor into the nominal position when inclination changes occurs. A first inertia mass in the form of a first instable compensation pendulum sensitive to acceleration forces is provided. The first compensation pendulum is pivotable about the pivot point of the pendulum mass. A first locking member is coupled to the first pendulum mass and the compensation pendulum. A stationary blocking toothing is provided. When horizontal acceleration forces occur, the pendulum mass and the first compensation pendulum pivot in opposite directions and force the first locking member into engagement with the blocking toothing for locking the pendulum mass relative to the safety belt reeling device.

6 Claims, 3 Drawing Sheets

5,740,980

SAFETY BELT REELING DEVICE WITH INCLINATION COMPENSATION FOR A VEHICLE-SENSITIVE SENSOR

BACKGROUND OF THE INVENTION

The present invention relates to a safety belt reeling device with inclination compensation whereby a part of the vehicle seat, such as the back rest or the seat portion, is adjustable relative to an axis that is oriented toward the center of the earth whereby the safety belt reeling device comprises a vehicle-sensitive acceleration sensor oriented toward the center of the earth in its nominal position as well as a pendulum device with a pendulum mass for returning the acceleration sensor upon change of inclination into its nominal position and further comprising an inertia mass activated by acceleration forces which inertia mass arrests via a locking member the pendulum device in its position at the safety belt reeling device.

A safety belt reeling device with the aforementioned features is known from British patent 15 99 188. In this known safety belt reeling device a pendulum device is coordinated with a vehicle-sensitive sensor which pendulum device upon inclination change of the vehicle seat, respectively, of a part of the vehicle seat, returns the vehicle-sensitive sensor of the safety belt reeling device into its respective nominal position. In order to prevent that the vehicle-sensitive sensor is acted on by horizontally acting vehicle acceleration or deceleration forces during operation of the vehicle, an additional vehicle sensor is connected to the pendulum device and coupled with a locking device for locking the pendulum device. Upon pivoting of the acceleration sensor caused by acceleration forces the pendulum device is locked so as to be arrested in its position. In this known design of a safety belt reeling device with inclination compensation it is disadvantageous that the locking of the pendulum device takes place only when a comparatively great deceleration force occurs. Furthermore, the known arrangement is complicated in its construction.

It is therefore an object of the present invention to provide for a safety belt reeling device of the aforementioned kind a fast response of the locking action of the pendulum device which effects the inclination compensation and, on the other hand, to provide a constructively simple and functionally reliable design for achieving the inclination compensation.

SUMMARY OF THE INVENTION

The safety belt reeling device with inclination compensation according to the present invention is primarily characterized by:

A vehicle-sensitive acceleration sensor oriented in a nominal position toward the center of the earth;

A pendulum mass, pivotable about a pivot point, acting on the acceleration sensor for returning the acceleration sensor into the nominal position when an inclination change occurs;

A first inertia mass in the form of a first instable compensation pendulum sensitive to acceleration forces, the first compensation pendulum being supported so as to be pivotable about the pivot point of the pendulum mass;

A first locking member coupled to the first pendulum mass and the compensation pendulum;

A stationary blocking toothing;

The first locking member operatively connected to the first compensation pendulum for locking the pendulum mass in a relative position at the safety belt device when the first compensation pendulum is activated by acceleration forces;

Wherein, when horizontal acceleration forces occur, the pendulum mass and the first compensation pendulum pivot in opposite directions and force the first locking member into engagement with the blocking toothing.

Preferably, the safety belt reeling device further comprises a bearing pin on which the pendulum mass and the first compensation pendulum are pivotably supported, wherein the first locking member comprises a bearing slot and is supported with the bearing slot on the bearing pin, the first locking member having a center of gravity located in the pivot point of the pendulum mass.

Advantageously, the first locking member comprises a first and a second horizontal arms extending oppositely in the direction of travel of the vehicle, wherein the first horizontal arm has a first slotted hole and the second horizontal arm has a second slotted hole, wherein the pendulum mass comprises a first pin received in the first slotted hole and the first compensation pendulum comprises a second pin received in the second slotted hole.

Preferably, the safety belt reeling device further comprises a second compensation pendulum and a second locking member, the second locking member connecting the second compensation pendulum to the pendulum mass, wherein the second compensation pendulum compensates acceleration forces occurring when accelerating from a stop and forces the second locking member into engagement with the blocking toothing.

Advantageously, the safety belt reeling device comprises a cover and the blocking toothing is connected to the cover, wherein the pendulum mass and the first and second compensation pendulums are arranged in the cover.

Preferably, the safety belt reeling device further comprises a push rod connection connected to the pendulum mass, wherein the pendulum mass acts with the push rod connection on the acceleration sensor for maintaining the nominal position.

Advantageously, the acceleration sensor is directly secured at the pendulum mass. The safety belt reeling device in this embodiment further comprises an impulse lever for blocking the safety belt reeling device, wherein a tip of the impulse lever is located within the pivot point of the pendulum mass.

The invention is based on the principle that the inertia mass as an instable compensation pendulum is supported at the pivot point of the pendulum mass whereby the locking member coupled with the pendulum mass as well as with the compensation pendulum is pivoted, when horizontal acceleration forces occur, by the opposite pivot movement of the pendulum mass and of the compensation pendulum into engagement with a blocking toothing stationarily embodied at the safety belt reeling device. With the invention it is advantageous that due to the direct operative connection between the inertia mass, i.e., the compensation pendulum, and the pendulum mass the entire pendulum unit performs the compensation, respectively, reorientation of the vehicle-sensitive sensor to the center of the earth as a unit without relative movement of parts to one another whereby, however, when horizontal acceleration forces occur, relative movements of the parts to one another are generated within this unit. This results in a locking of the pendulum unit in its respective nominal position. The direct operative connection also results in that the pendulum unit, respectively its parts remain in their relative position due to inner friction, when minimal acceleration forces occur, so that for minimal acceleration forces a pivoting of the vehicle-sensitive sensor away from its nominal position is prevented. Thus, the inventive pendulum unit is designed such that each pendulum deflection due to horizontal accelerations acting on the pendulum unit results in a locking of the pendulum unit in its respective position during the period of action of the respective acceleration forces. Inasmuch as in one of the embodiments an inertia mass in the form of a compensation pendulum is provided, the pendulum unit is designed for responding to accelerations in one direction, i.e., expediently for activation by deceleration of the vehicle.

For this purpose, it is known from German Gebrauchsmuster 78 11 279 to embody a vehicle-sensitive sensor for controlling the blocking device of the safety belt reeling device so as to be comprised of a stable and an instable pendulum which together form a stable pendulum unit. This design results in an improvement of the response time of the vehicle-sensitive sensor.

Furthermore, from U.S. Pat. No. 4,164,337 a safety belt reeling device with inclination compensation for the vehicle-sensitive sensor is known in which a vehicle-sensitive sensor in the form of a pendulum is arranged within an indifferently supported pendulum unit which comprises a compensation weight so that upon changing of the inclination of a back rest of a vehicle seat supporting the safety belt reeling device a reorientation of the pendulum device with vehicle-sensitive sensor arranged thereat to the center of the earth is provided. When vehicle acceleration forces occur, a locking of the entire pendulum unit as well as of the coordinated safety belt reeling device takes place.

According to one embodiment of the invention it is suggested that the locking member is supported in a slotted hole positioned on the bearing pin of the pendulum mass and of the compensation pendulum and that its center of gravity is positioned on the pivot point of the pendulum mass and of the compensation pendulum. It is suggested in this context that the locking member be provided with laterally horizontally extending arms pointing in the direction of travel of the vehicle. These horizontal arms are provided with slotted holes for receiving pins of opposite orientation connected to the pendulum mass and the compensation pendulum. Inasmuch as an arresting of the pendulum also in the counter direction of acceleration forces is desired, i.e., for accelerating from a stop, the invention in another embodiment suggests that, for compensation of acceleration forces occurring when accelerating from a stop, a second compensation pendulum be connected via a second locking member to the pendulum mass.

According to another embodiment of the invention, it may be expedient that the pendulum mass provides for an inclination compensation of the vehicle-sensitive sensor via a push rod connection. This is, in general, known from adjustable vehicle sensors disclosed in German Offenlegungsschrift 36 11 004.

Alternatively, the vehicle-sensitive sensor can be directly connected to the pendulum mass and the tip of the impulse lever which initiates the blocking of the safety belt reeling device can be arranged at the pivot point of the pendulum mass and of the compensation pendulum. This is advantageous since a pivoting of the pendulum unit does not affect the position of the impulse lever. The attachment of a vehicle-sensitive sensor directly at the pendulum mass of a correspondingly embodied safety belt reeling device is known from U.S. Pat. No. 3,552,676.

According to one embodiment of the invention, it is suggested that the pendulum unit with pendulum mass and compensation pendulum be arranged in the cover of the safety belt reeling device. The cover is then provided at its inner side with the blocking toothing for the coordinated locking member. A respective arrangement is, for example, known from U.S. Pat. No. 5,289,986. This arrangement is advantageous because the pendulum unit can be arranged in a space-saving manner within the safety belt reeling device as suggested in U.S. Pat. No. 5,289,986.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1:
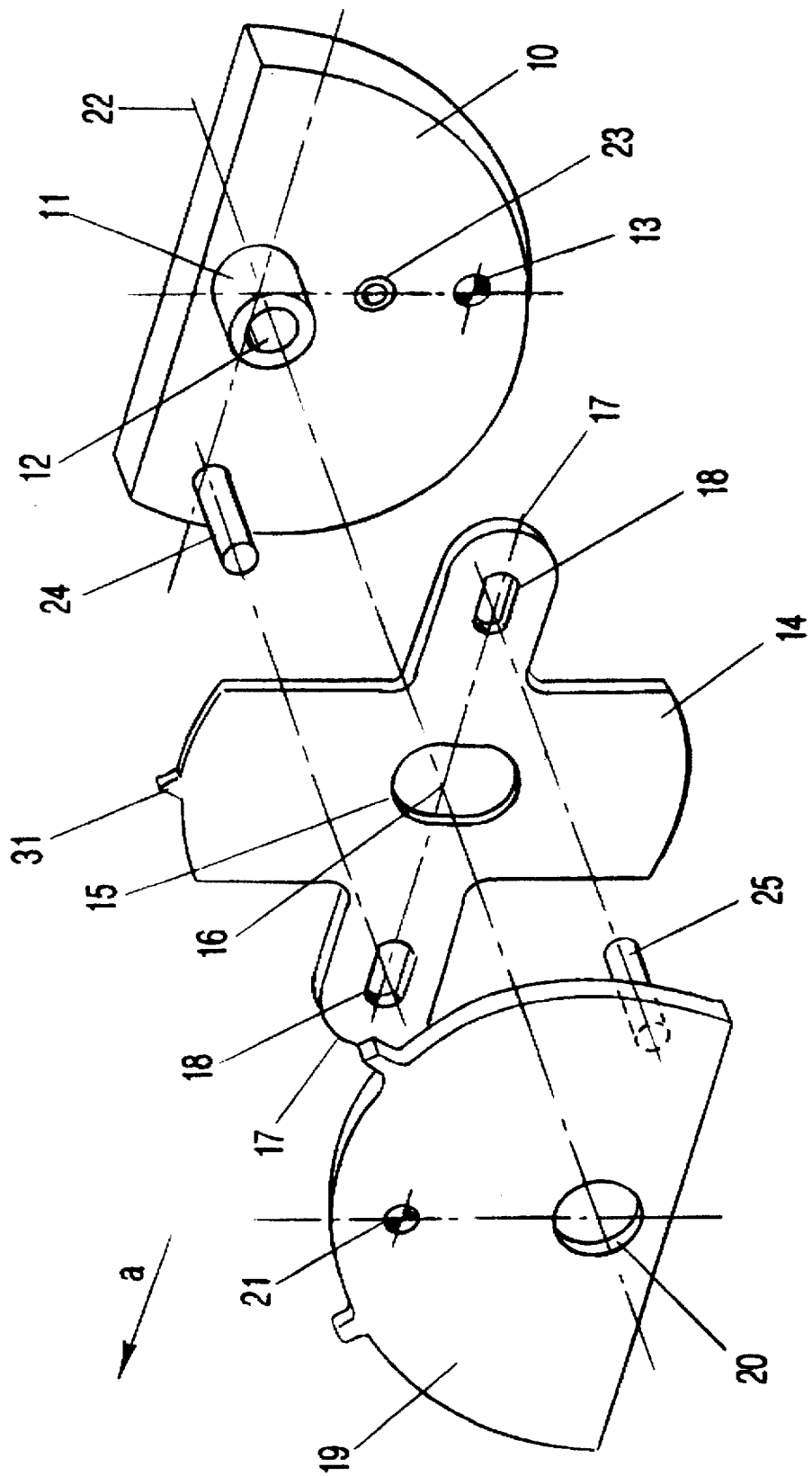
FIG. 1 is an exploded view of the pendulum unit comprised of the pendulum mass and the inertia mass.

As can be seen in FIG. 1, the pendulum unit is comprised of a pendulum mass 10 which is pivotably connected with a pin 11 embodied as a pivot bearing 12 in a non-represented manner at a part of the safety belt reeling device. The center of gravity 13 of the pendulum mass 10 is located below the pivot point 22 so that the desired pendulum function results. As can be seen in FIG. 2, the entire pivot range of the pendulum mass 10 is 40°, i.e., 20° from the central position (angle $\beta$) in each direction. This is desirable for practical applications.

A locking member 14 is positioned with a slotted hole 15 on the bearing pin 11 of the pendulum mass 10 such that the locking member 14 is linearly displaceable relative to the pin 11 of the pendulum mass 10. The center of gravity 16 of the locking member 14 is located at the pivot point 22 of the entire pendulum unit so that upon pivoting of the pendulum mass 10 the locking member 14 acts neutral with respect to the pendulum action. The locking member 14 comprises, in the direction of travel of the vehicle, laterally extending horizontal arms 17 which are provided with slotted holes 18.

A compensation pendulum 19 with a bearing bore 20 is supported on the bearing pin 11 of the pendulum mass 10 whereby the compensation pendulum 19, with respect to the mass of the pendulum mass 10, is substantially smaller. Its center of gravity 21 is positioned above the pivot point 22 so as to be in an instable position. The entire pendulum unit has a center of gravity 23 (shown in FIG. 2) which is responsible for the actual task of the pendulum unit, i.e., to orient permanently the vehicle-sensitive sensor to the center of the earth. Thus, the center of gravity 23 of the pendulum unit is positioned below the pivot point 22.

The pendulum mass 10 as well as the compensation pendulum 19 engage with a respective follower pin 24, 25 the coordinated slotted holes 18 of the locking member 14. Due to the respective arrangement of the follower pins 24, 25 and the slotted holes 18, the relative movements of the pendulum mass 10 to the locking member 14, on the one hand, and of the compensation pendulum 19 to the locking member 14 (and thus also to the pendulum mass 10) are predetermined. Thus, in the embodiment represented in FIG. 1, the pendulum mass 10 can rotate in the clockwise direction when horizontally acting acceleration forces (braking forces), shown by arrow a, occur. In the same manner, the compensation pendulum 19, due to its connection via the follower pin 25 to the locking member 14, can rotate only counterclockwise. The opposite rotational movements of the pendulum mass 10 and of the compensation pendulum 19 are transformed into an upwardly oriented lifting movement of the locking member 14. The lifting stroke is limited by the length of the slotted hole 15, respectively, also by the lateral extension of the slotted holes 18. Additionally, the lifting stroke is also limited by engagement of the tip 31 of the locking member in the inner toothing 30 of the cover 29 of the safety belt reeling device, as is shown in FIG. 2.

Due to the adjusted mass and leverage ratios, a locking of the pendulum mass 10 occurs already for a minimal pendulum deflection. There are no great locking forces so that the height of the teeth of the blocking toothing 30 can be minimal.

The smaller the locking stroke of the locking member 14 the smaller the rotational angle of the pendulum mass 10 and of the compensation pendulum 19. Accordingly, the deviation of the vehicle-sensitive sensor from its ideal position is also minimized. Thus, a locking of the pendulum mass 10 can be realized already for a deflection of about 3° which is a very small error for the response level of the vehicle-sensitive sensor.

Figure 2:
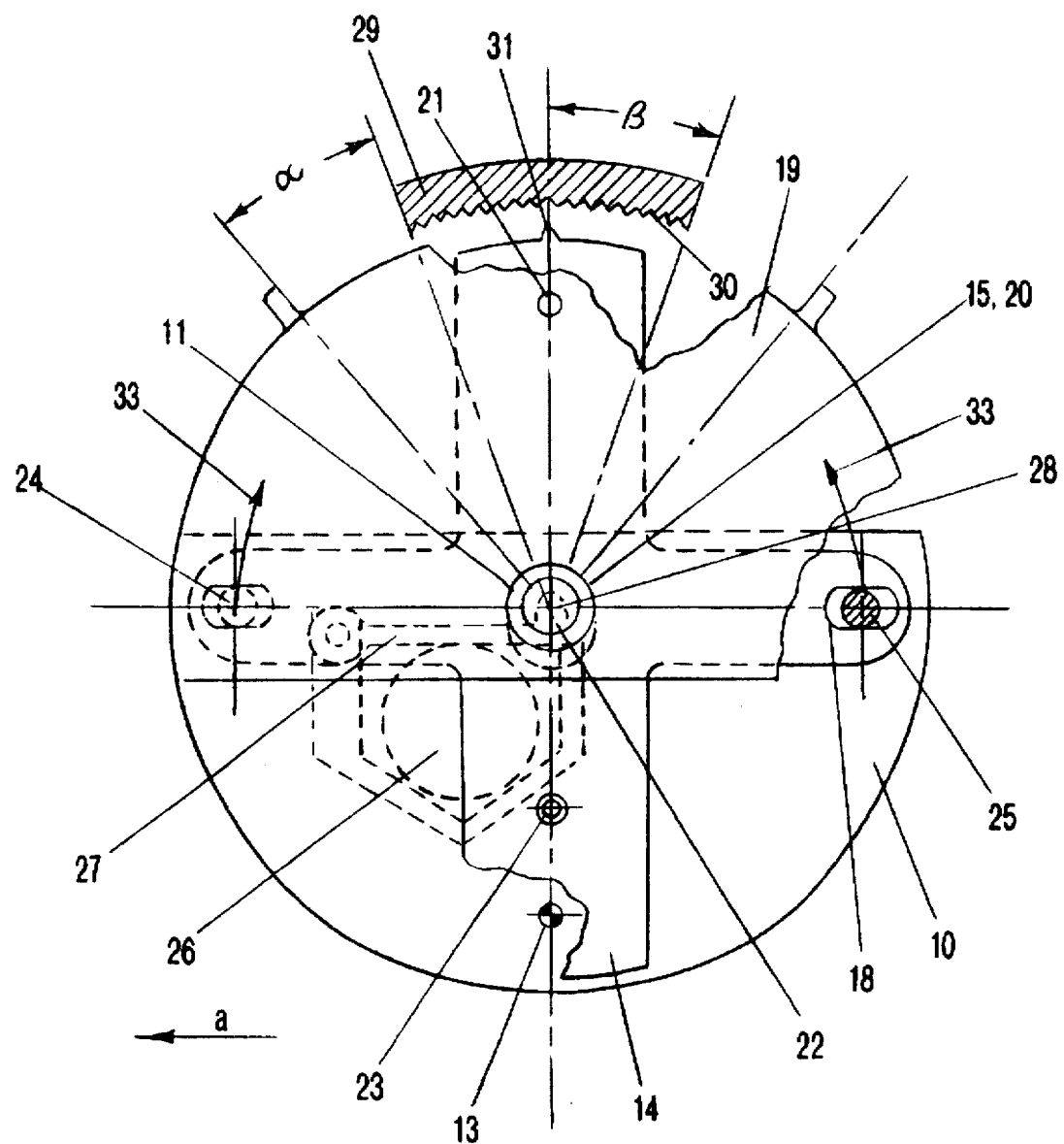
FIG. 2 shows a plan view of the pendulum unit of FIG. 1 mounted at a safety belt reeling device.

In the representation of FIG. 2, a connection between the vehicle-sensitive sensor 26 and the pendulum mass 10 is shown. In the shown embodiment the vehicle-sensitive sensor 26 is arrested at the pendulum mass 10 such that the tip 28 of the impulse lever 27, which activates the locking lever for blocking the safety belt reeling device, is positioned at the pivot point 22 of the pendulum unit so that upon pivoting of the pendulum unit the position of the locking lever is not affected. In the alternative, the pendulum mass can be coupled with a push rod connection to the vehicle-sensitive sensor in order to achieve inclination compensation. This is not represented in the drawings.

In the embodiment represented in FIGS. 1 and 2, the position of the pendulum mass 10 simultaneously determines the position of the vehicle-sensitive sensor 26. In this embodiment, no relative movement takes place between the three components of the pendulum unit, i.e., the pendulum mass 10, the locking member 14, and the compensation pendulum 19, because the instable compensation pendulum 19 is forced to follow all movements of the pendulum mass 10 due to the coupling via the locking member 14. Only for horizontal acceleration forces in the direction of travel, i.e., at a right angle to the pivot axis extending through the pivot point 22 (indicated by arrow a), the pendulum mass 10 and the compensation pendulum 19 pivot relative to one another in opposite direction and thus lift the locking member 14 into its locking position with engagement of its tip 31 in the inner blocking toothing 30 of the cover 29. When the acceleration forces are reduced to zero, the compensation pendulum 19 is returned by the weight of the locking member 14 into its initial position. The locking member 14 can be of a very light-weight construction because the instable compensation pendulum 19 cannot develop a considerable torque for a small pivot angle in order to reach the stable position. This lifting movement is indicated with arrows 33 in FIG. 2.

Figure 3:
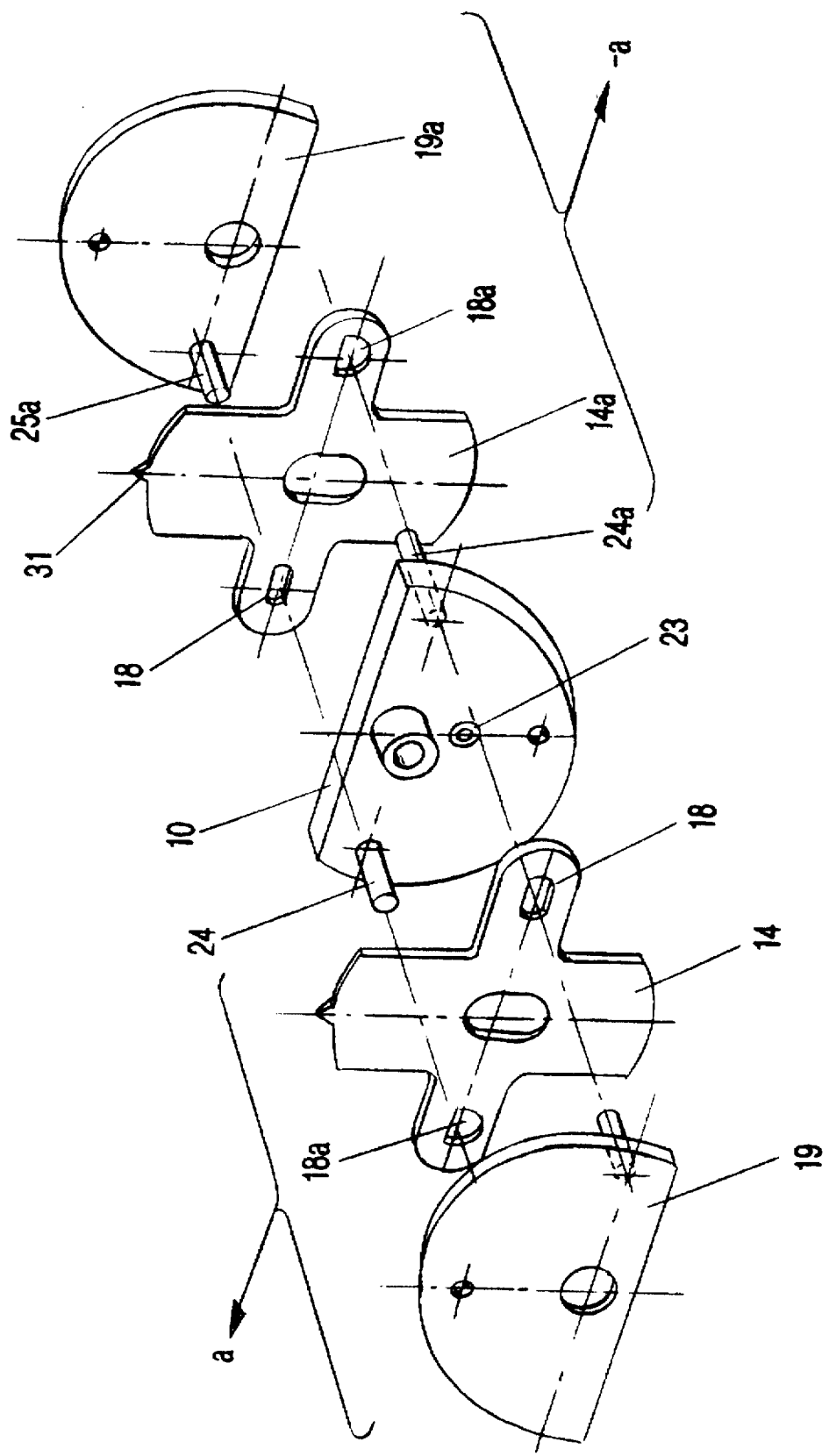
FIG. 3 shows another embodiment of the pendulum unit of FIG. 1.

When it is desired to secure the pendulum mass 10 against acceleration forces occurring when accelerating the vehicle from a dead stop (arrow -a in FIG. 3), it is suggested with the embodiment represented in FIG. 3 to provide a further compensation pendulum 19a and a further locking member 14a on a corresponding bearing pin of the pendulum mass 10. In analogy to FIGS. 1 and 2, the compensation pendulum 19a is supported with a bearing bore 20a on the corresponding pin 11 and has a center of gravity 21a which is located above the pivot point 22. With a correspondingly coordinated follower pin 25a the compensation pendulum 19a engages the respective slotted hole 18a of the locking member 14a. Additionally, the pendulum mass 10 is provided with a further follower pin 24a which engages the respective slotted hole 18a of the locking member 14a. The coordination of the follower pins to the respective slotted holes of the locking member 14a is selected such that a deflection of the pendulum mass 10 results in a deflection of the second compensation pendulum 19a in the same direction. In the embodiment of FIG. 3, the slotted holes 18a and 18 of the two locking members 14 and 14a coordinated with the corresponding follower pins 24 and 24a are enlarged in the downward direction in order to provide a degree of freedom in the respective inactive direction of movement of the pendulum mass 10 with its follower pin 24 and 24a. The embodiment of FIG. 3 otherwise functions identical to the embodiment of FIGS. 1 and 2.

The present invention is, of course, in no way restricted to the specific disclosure of the specification and drawings, but also encompasses any modifications within the scope of the appended claims.

What I claim is:

1. An inclination-compensatable safety belt reeling device connected to a vehicle seat, wherein the part of the vehicle seat to which said safety belt reeling device is connected is inclination-adjustable relative to an axis oriented to the center of the earth, said safety belt reeling device comprising:

a vehicle-sensitive acceleration sensor to be aligned in a nominal position to the center of the earth;

a pendulum mass, pivotable about a pivot point, acting on said acceleration sensor for returning said acceleration sensor into the nominal position when an inclination change occurs;

a first inertia mass in the form of a first instable compensation pendulum sensitive to acceleration forces, said first compensation pendulum being supported so as to be pivotable about said pivot point of said pendulum mass;

a first locking member coupled to said pendulum mass and said compensation pendulum;

a stationary blocking toothing;

said first locking member operatively connected to said first compensation pendulum for locking said pendulum mass in a relative position at said safety belt device when said first compensation pendulum is activated by acceleration forces;

wherein, when horizontal acceleration forces occur, said pendulum mass and said first compensation pendulum pivot in opposite directions and force said first locking member into engagement with said blocking toothing.

2. A safety belt reeling device according to claim 1, further comprising a bearing pin on which said pendulum mass and said first compensation pendulum are pivotably supported, wherein said first locking member comprises a bearing slot and is supported with said bearing slot on said bearing pin, said first locking member having a center of gravity located in said pivot point of said pendulum mass.

3. A safety belt reeling device according to claim 1, wherein said first locking member comprises a first and a second horizontal arms extending oppositely in the direction of travel of the vehicle, wherein said first horizontal arm has a first slotted hole and wherein said second horizontal arm has a second slotted hole, wherein said pendulum mass comprises a first pin received in said first slotted hole and said first compensation pendulum comprises a second pin received in said second slotted hole.

4. A safety belt reeling device according to claim 1, further comprising a second compensation pendulum and a second locking member, said second locking member connecting said second compensation pendulum to said pendulum mass, wherein said second compensation pendulum compensates acceleration forces occurring when accelerating from a stop and forces said second locking member into engagement with said blocking toothing.

5. A safety belt reeling device according to claim 4, wherein said safety belt reeling device comprises a cover and wherein said blocking toothing is connected to said cover, wherein said pendulum mass and said first and second compensation pendulums are arranged in said cover.

6. A safety belt reeling device according to claim 1, wherein said acceleration sensor is directly secured at said pendulum mass, further comprising an impulse lever for blocking said safety belt reeling device, wherein a tip of said impulse lever is located within said pivot point of said pendulum mass.

* * * * *